US010355813B2

United States Patent
Nammi et al.

(10) Patent No.: US 10,355,813 B2
(45) Date of Patent: Jul. 16, 2019

(54) LINK ADAPTATION ON DOWNLINK CONTROL CHANNEL IN A WIRELESS COMMUNICATIONS SYSTEM

(71) Applicant: AT&T Intellectual Property I, L.P., Atlanta, GA (US)

(72) Inventors: SaiRamesh Nammi, Austin, TX (US); Xiaoyi Wang, Austin, TX (US); Arunabha Ghosh, Austin, TX (US); Ralf Bendlin, Portland, OR (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/432,515

(22) Filed: Feb. 14, 2017

(65) Prior Publication Data

US 2018/0234204 A1    Aug. 16, 2018

(51) Int. Cl.
*H04W 4/00* (2018.01)
*H04L 1/00* (2006.01)

(52) U.S. Cl.
CPC ........... *H04L 1/001* (2013.01); *Y02D 70/00* (2018.01); *Y02D 70/10* (2018.01); *Y02D 70/12* (2018.01); *Y02D 70/122* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01);
(Continued)

(58) Field of Classification Search
None
See application file for complete search history.

(56) References Cited

U.S. PATENT DOCUMENTS 7,002,949 B2    2/2006    Garcia-luna-sceves et al.
7,020,110 B2    3/2006    Walton et al.
(Continued)

FOREIGN PATENT DOCUMENTS

CN    1627849 A    6/2005
CN    101631355 A    1/2010
(Continued)

OTHER PUBLICATIONS

Mogensen et al. "5G small cell optimized radio design." IEEE. 2013. http://vbn.aau.dk/files/195969578/Globecom_5G_2013_v16emb.pdf, 2013, 7 pages.
(Continued)

*Primary Examiner* — Phirin Sam
(74) *Attorney, Agent, or Firm* — Amin, Turocy & Watson, LLP

(57) ABSTRACT

Link adaptation on downlink control channels is provided herein. A method can comprise sending, by a network device of a wireless network and comprising a processor, first data indicating a first downlink control channel to a mobile device. The first data indicating the downlink control channel can comprise a first coreset indication that comprises a first parameter used to decode the first downlink control channel at the mobile device. The method can also include determining, by the network device, a second coreset indication for the mobile device. The second coreset indication can comprise a second parameter that can be adaptively determined based on a condition of an environment determined to be associated with the mobile device.

19 Claims, 11 Drawing Sheets

(52) U.S. Cl.
CPC ........ *Y02D 70/1264* (2018.01); *Y02D 70/142* (2018.01); *Y02D 70/144* (2018.01); *Y02D 70/146* (2018.01); *Y02D 70/162* (2018.01); *Y02D 70/21* (2018.01); *Y02D 70/23* (2018.01)

(56) References Cited

U.S. PATENT DOCUMENTS

| | | |
|---|---|---|
| 7,260,366 B2 | 8/2007 | Lee et al. |
| 7,551,546 B2 | 6/2009 | Ma et al. |
| 7,636,573 B2 | 12/2009 | Walton et al. |
| 7,698,463 B2 | 4/2010 | Ogier et al. |
| 7,877,067 B2 | 1/2011 | Hwang et al. |
| 7,907,512 B1 | 3/2011 | Von der Embse |
| 8,018,889 B2 | 9/2011 | Lim et al. |
| 8,055,269 B2 | 11/2011 | Feher |
| 8,102,794 B2 | 1/2012 | Shin et al. |
| 8,159,399 B2 | 4/2012 | Dorsey et al. |
| 8,165,536 B2 | 4/2012 | Sekiya et al. |
| 8,189,577 B2 | 5/2012 | Vaswani et al. |
| 8,218,550 B2 | 7/2012 | Axelsson et al. |
| 8,271,043 B2 | 9/2012 | Kim et al. |
| 8,300,555 B2 | 10/2012 | Horn et al. |
| 8,306,525 B2 | 11/2012 | Feher |
| 8,423,068 B2 | 4/2013 | Tiwari et al. |
| 8,509,060 B1 | 8/2013 | Dong et al. |
| 8,537,658 B2 | 9/2013 | Sayana et al. |
| 8,537,714 B2 | 9/2013 | Liu |
| 8,553,560 B2 | 10/2013 | Axelsson et al. |
| 8,578,054 B2 | 11/2013 | Thubert et al. |
| 8,665,797 B2 | 3/2014 | Ding et al. |
| 8,681,747 B2 | 3/2014 | Dateki et al. |
| 8,711,716 B2 | 4/2014 | Chen et al. |
| 8,761,834 B2 | 6/2014 | Luz et al. |
| 8,774,154 B2 | 7/2014 | Bui |
| 8,787,257 B2 | 7/2014 | Fujita |
| 8,798,011 B2 | 8/2014 | Prasad et al. |
| 8,854,997 B2 | 10/2014 | Clow et al. |
| 8,873,496 B2 | 10/2014 | Moulsley et al. |
| 8,948,046 B2 | 2/2015 | Kang et al. |
| 9,007,992 B2 | 4/2015 | Charbit et al. |
| 9,013,974 B2 | 4/2015 | Walton et al. |
| 9,019,068 B2 | 4/2015 | Varoglu |
| 9,037,076 B2 | 5/2015 | Nagata et al. |
| 9,059,753 B2 | 6/2015 | Yang et al. |
| 9,078,187 B2 | 7/2015 | Huh |
| 9,084,261 B2 | 7/2015 | Gholmieh et al. |
| 9,094,145 B2 | 7/2015 | Yue et al. |
| 9,154,198 B2 | 10/2015 | El-Najjar et al. |
| 9,154,210 B2 | 10/2015 | Li et al. |
| 9,155,098 B2 | 10/2015 | Geirhofer et al. |
| 9,161,381 B2 | 10/2015 | Lee et al. |
| 9,184,870 B2 | 11/2015 | Sampath et al. |
| 9,191,098 B2 | 11/2015 | Kazmi et al. |
| 9,215,322 B1 | 12/2015 | Wu et al. |
| 9,240,871 B2 | 1/2016 | Walton et al. |
| 9,241,311 B2 | 1/2016 | Sebeni et al. |
| 9,246,651 B2 | 1/2016 | Guo et al. |
| 9,265,053 B2 | 2/2016 | Blankenship et al. |
| 9,288,719 B2 | 3/2016 | Hui et al. |
| 9,306,725 B2 | 4/2016 | Papasakellariou et al. |
| 9,307,489 B2 | 4/2016 | Yerrabommanahalli et al. |
| 9,313,747 B2 | 4/2016 | Zhu et al. |
| 9,337,970 B2 | 5/2016 | Hammarwall et al. |
| 9,338,769 B1 | 5/2016 | Naim et al. |
| 9,357,472 B2 | 5/2016 | Mukherjee |
| 9,401,750 B2 | 7/2016 | Sayana et al. |
| 9,408,220 B2 | 8/2016 | Gore et al. |
| 9,413,509 B2 | 8/2016 | Chen et al. |
| 9,414,427 B2 | 8/2016 | Yang et al. |
| 9,420,577 B2 | 8/2016 | Kim et al. |
| 9,432,876 B2 | 8/2016 | Ji et al. |
| 9,451,476 B2 | 9/2016 | Shoshan et al. |
| 9,467,909 B2 | 10/2016 | Faerber et al. |
| 9,510,340 B2 | 11/2016 | Kim et al. |
| 9,602,183 B2 * | 3/2017 | Kim .................... H04L 1/0026 |
| 9,742,480 B1 * | 8/2017 | Nammi ................ H04B 7/0486 |
| 10,027,401 B2 | 7/2018 | Speight et al. |
| 2003/0039217 A1 | 2/2003 | Seo et al. |
| 2003/0043756 A1 | 3/2003 | Reynders et al. |
| 2004/0162048 A1 | 8/2004 | Milbar et al. |
| 2004/0253955 A1 | 12/2004 | Love et al. |
| 2004/0255040 A1 | 12/2004 | Lopes et al. |
| 2005/0036487 A1 | 2/2005 | Srikrishna |
| 2005/0250506 A1 | 11/2005 | Beale et al. |
| 2006/0240777 A1 | 10/2006 | Ruuska |
| 2007/0110198 A1 | 5/2007 | Skarby et al. |
| 2007/0160156 A1 | 7/2007 | Melzer et al. |
| 2007/0253496 A1 | 11/2007 | Giannakis et al. |
| 2007/0288618 A1 | 12/2007 | Yeo et al. |
| 2008/0002723 A1 | 1/2008 | Pusateri |
| 2008/0095223 A1 | 4/2008 | Tong et al. |
| 2009/0029645 A1 | 1/2009 | Leroudier |
| 2009/0052448 A1 | 2/2009 | Ramakrishnan et al. |
| 2009/0073922 A1 | 3/2009 | Malladi et al. |
| 2009/0168915 A1 | 7/2009 | Aoki et al. |
| 2009/0262673 A1 | 10/2009 | Hermersdorf |
| 2010/0002675 A1 | 1/2010 | Fu et al. |
| 2010/0067591 A1 | 3/2010 | Luo et al. |
| 2010/0178057 A1 | 7/2010 | Shieh |
| 2010/0202322 A1 | 8/2010 | Cai et al. |
| 2011/0039495 A1 | 2/2011 | Sawai et al. |
| 2011/0085513 A1 | 4/2011 | Chen et al. |
| 2011/0096727 A1 | 4/2011 | Bergman et al. |
| 2011/0176445 A1 | 7/2011 | Chen |
| 2011/0281579 A1 | 11/2011 | Kummetz |
| 2011/0305161 A1 | 12/2011 | Ekpenyong et al. |
| 2012/0013564 A1 | 1/2012 | Westhues et al. |
| 2012/0087276 A1 | 4/2012 | Huang et al. |
| 2012/0093109 A1 | 4/2012 | Dong et al. |
| 2012/0327757 A1 | 12/2012 | Wang et al. |
| 2012/0327794 A1 | 12/2012 | Han et al. |
| 2013/0095748 A1 | 4/2013 | Hu et al. |
| 2013/0301628 A1 | 5/2013 | Dacosta et al. |
| 2013/0155831 A1 | 6/2013 | Kim et al. |
| 2013/0215844 A1 | 8/2013 | Seol et al. |
| 2013/0235808 A1 | 9/2013 | Earnshaw et al. |
| 2013/0242902 A1 | 9/2013 | Liu et al. |
| 2013/0258973 A1 | 10/2013 | Khoshnevis et al. |
| 2013/0336199 A1 | 12/2013 | Schwartz et al. |
| 2013/0337795 A1 * | 12/2013 | Falconetti ............... H04L 5/001 |
| | | 455/419 |
| 2014/0010126 A1 | 1/2014 | Sayana et al. |
| 2014/0016534 A1 | 1/2014 | Kim et al. |
| 2014/0044061 A1 | 2/2014 | Yue et al. |
| 2014/0064160 A1 | 3/2014 | Verger et al. |
| 2014/0086063 A1 | 3/2014 | Wu |
| 2014/0146754 A1 | 5/2014 | Bayesteh et al. |
| 2014/0189155 A1 | 7/2014 | Morris |
| 2014/0281670 A1 | 9/2014 | Vasseur et al. |
| 2015/0071242 A1 | 3/2015 | Vilaipornsawai et al. |
| 2015/0092695 A1 | 4/2015 | Zhao et al. |
| 2015/0139208 A1 | 5/2015 | Chan et al. |
| 2015/0146655 A1 | 5/2015 | Hui et al. |
| 2015/0155993 A1 * | 6/2015 | Berggren ............. H04L 5/0023 |
| | | 370/330 |
| 2015/0181534 A1 | 6/2015 | Andersson et al. |
| 2015/0188650 A1 | 7/2015 | Au et al. |
| 2015/0215085 A1 * | 7/2015 | Xu .......................... H04W 4/06 |
| | | 370/312 |
| 2015/0245272 A1 | 8/2015 | Lindoff et al. |
| 2015/0282150 A1 | 10/2015 | Nigam et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |
| 2015/0341093 A1 | 11/2015 | Kwak et al. |
| 2015/0341100 A1 | 11/2015 | Kwak et al. |
| 2015/0351098 A1 | 12/2015 | Schellmann et al. |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0014762 A1 * | 1/2016 | Ji .......................... H04L 5/0094 |
| | | 370/329 |
| 2016/0028520 A1 * | 1/2016 | Nogami ................ H04L 1/0013 |
| | | 370/329 |

(56) References Cited

U.S. PATENT DOCUMENTS

| | | | |
|---|---|---|---|
| 2016/0029359 A1 | 1/2016 | Agiwal et al. | |
| 2016/0050039 A1 | 2/2016 | Ma et al. | |
| 2016/0080187 A1 | 3/2016 | Yun et al. | |
| 2016/0080961 A1 | 3/2016 | Kim et al. | |
| 2016/0080963 A1* | 3/2016 | Marinier | H04L 5/0053 370/252 |
| 2016/0087694 A1 | 3/2016 | Vilaipornsawai et al. | |
| 2016/0088521 A1 | 3/2016 | Ho et al. | |
| 2016/0119097 A1 | 4/2016 | Nam et al. | |
| 2016/0128028 A1 | 5/2016 | Mallik et al. | |
| 2016/0128034 A1 | 5/2016 | Choi et al. | |
| 2016/0128072 A1 | 5/2016 | Rajagopal et al. | |
| 2016/0142117 A1 | 5/2016 | Rahman et al. | |
| 2016/0142292 A1 | 5/2016 | Au et al. | |
| 2016/0149686 A1 | 5/2016 | Tsai | |
| 2016/0154756 A1 | 6/2016 | Dodson et al. | |
| 2016/0183242 A1 | 6/2016 | Cordeiro et al. | |
| 2016/0191216 A1 | 6/2016 | Ma et al. | |
| 2016/0211999 A1 | 7/2016 | Wild et al. | |
| 2016/0233938 A1 | 8/2016 | Mondal et al. | |
| 2016/0254889 A1 | 9/2016 | Shattil | |
| 2016/0255667 A1 | 9/2016 | Schwartz | |
| 2016/0262118 A1 | 9/2016 | Kim et al. | |
| 2016/0269135 A1 | 9/2016 | Jiang et al. | |
| 2016/0269212 A1 | 9/2016 | Vilaipornsawai et al. | |
| 2016/0285611 A1 | 9/2016 | Fischer et al. | |
| 2016/0294521 A1 | 10/2016 | Au et al. | |
| 2016/0301505 A1* | 10/2016 | Furuskog | H04W 72/00 |
| 2016/0352543 A1 | 12/2016 | Hu et al. | |
| 2016/0352551 A1 | 12/2016 | Zhang et al. | |
| 2016/0353374 A1 | 12/2016 | Höglund et al. | |
| 2016/0353420 A1 | 12/2016 | You et al. | |
| 2016/0353453 A1 | 12/2016 | Au et al. | |
| 2016/0353475 A1 | 12/2016 | Au et al. | |
| 2017/0019847 A1 | 1/2017 | Han et al. | |
| 2017/0078054 A1 | 3/2017 | Hadani et al. | |
| 2017/0118054 A1 | 4/2017 | Ma et al. | |
| 2017/0126299 A1* | 5/2017 | Wei | H04W 24/10 |
| 2017/0126458 A1 | 5/2017 | Shattil | |
| 2017/0134205 A1 | 5/2017 | Kim et al. | |
| 2017/0163456 A1 | 6/2017 | Chen | |
| 2017/0223700 A1 | 8/2017 | Thubert et al. | |
| 2017/0237537 A1* | 8/2017 | Nogami | H04L 1/0013 370/329 |
| 2017/0257238 A1 | 9/2017 | Qian et al. | |
| 2017/0257860 A1* | 9/2017 | Nam | H04L 27/2602 |
| 2017/0265119 A1 | 9/2017 | Fang | |
| 2017/0272210 A1 | 9/2017 | Zhang | |
| 2017/0288928 A1 | 10/2017 | Xu et al. | |
| 2017/0311188 A1* | 10/2017 | Sun | H04L 5/0048 |
| 2017/0325246 A1* | 11/2017 | Agarwal | H04W 72/0406 |
| 2017/0367046 A1* | 12/2017 | Papasakellariou | H04L 5/0053 |
| 2017/0374558 A1 | 12/2017 | Zhao et al. | |
| 2018/0014320 A1 | 1/2018 | Xu et al. | |
| 2018/0035423 A1 | 2/2018 | Wang et al. | |
| 2018/0035459 A1* | 2/2018 | Islam | H04L 1/16 |
| 2018/0049233 A1 | 2/2018 | Luo et al. | |
| 2018/0049236 A1* | 2/2018 | Sun | H04W 72/14 |
| 2018/0062823 A1 | 3/2018 | Hasegawa | |
| 2018/0063818 A1 | 3/2018 | Chen et al. | |
| 2018/0092095 A1 | 3/2018 | Zeng et al. | |
| 2018/0097598 A1* | 4/2018 | Ang | H04W 52/0245 |
| 2018/0167933 A1* | 6/2018 | Yin | H04L 23/00 |
| 2018/0176059 A1* | 6/2018 | Medles | H04L 27/2613 |
| 2018/0184410 A1* | 6/2018 | John Wilson | H04W 72/0406 |
| 2018/0219606 A1* | 8/2018 | Ng | H04B 7/0617 |
| 2018/0220400 A1* | 8/2018 | Nogami | H04L 5/0078 |
| 2018/0227156 A1* | 8/2018 | Papasakellariou | H04L 27/2613 |

FOREIGN PATENT DOCUMENTS

| | | |
|---|---|---|
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| EP | 0720316 A1 | 7/1996 |
| EP | 1 998 586 A1 | 12/2008 |
| EP | 2 400 674 A2 | 12/2011 |
| EP | 2 858 408 A1 | 4/2015 |
| EP | 3 065 448 A1 | 9/2016 |
| EP | 3160051 A1 | 4/2017 |
| JP | 2011205679 A | 10/2011 |
| JP | 6373076 B2 | 12/2013 |
| WO | 2005064872 A1 | 7/2005 |
| WO | 2008011717 A1 | 1/2008 |
| WO | 2013081628 A1 | 6/2013 |
| WO | 2013107053 A1 | 7/2013 |
| WO | 2013136777 A1 | 9/2013 |
| WO | 2015095844 A1 | 6/2015 |
| WO | 2015108460 A1 | 7/2015 |
| WO | 2015122665 A1 | 8/2015 |
| WO | 2015140601 A1 | 9/2015 |
| WO | 2015186974 A1 | 12/2015 |
| WO | 2016/023207 A1 | 2/2016 |
| WO | 2016026507 A1 | 2/2016 |
| WO | 2016030300 A1 | 3/2016 |
| WO | 2016065068 A3 | 4/2016 |
| WO | 2016068628 A1 | 5/2016 |
| WO | 2016086971 A1 | 6/2016 |
| WO | 2016105120 A1 | 6/2016 |
| WO | 2016128728 A2 | 8/2016 |
| WO | 2016170389 A1 | 10/2016 |

OTHER PUBLICATIONS

Peng et al. "System architecture and key technologies for 5G heterogeneous cloud radio access networks." IEEE network 29.2 (2015): 614. http://arxiv.org/pdf/1412.6677, 20 pages.

Mogensen et al. "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf, 7 pages.

Li et al. ""Energyoptimal scheduling with dynamic channel acquisition in wireless downlinks."" IEEE Transactions on Mobile Computing 9.4 (2010): 527539. http://wwwbcf.usc.edu/~mjneely/pdf_papers/lineelycdc07.pdf, 8 pages.

Huynh et al "Joint Downlink and Uplink Interference Management for Device to Device Communication Underlaying Cellular Networks." Year: 2016 vol. 4 pp. 4420 4430 DOI:10.1109/ACCESS.2016.2603149 IEEE Journals & Magazines. http://ieeexplore.ieee.org/iel7/6287639/7419931/07552542.pdf, 11 pages.

Jungnickel et al. ""The role of small cells coordinated multipoint and massive MIMO in 5G."" IEEE Communications Magazine 52.5 (2014): 44-51. http://nashville.dyndns.org:823/YourFreeLibrary/_lte/Small%20Cells/smallCells1.pdf.

Nam et al. "Advanced interference management for 5G cellular networks." IEEE Communications Magazine 52.5 (2014): 52-60. https://www.researchgate.net/profile/Dongwoon_Baipublication/262416968_Advanced_Interference_Management_for_5G_Cellular_Networks2/links/5515c7890cf2f7d80a3594b5.pdf, 10 pages.

Guvensen et al. "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436, 47 pages.

Björnson. "Massive MIMO for 5G." Tutorial at 2015 IEEE International Workshop SPAWC Stockholm Sweden Jun. 29, 2015. https://pdfs.semanticscholar.org/85fc/19cd9a0090c4e32f5520d8edc86b592f5178.pdf, 58 pages.

Yang et al. "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/tvt-hanzo-2410759-proof%20(1).pdf, 38 pages.

Yong et al. "A survey of millimeter wave communications (mmWave) for 5G: opportunities and challenges." Wireless Networks 21.8 (2015): 17 pages.

(56) References Cited

OTHER PUBLICATIONS

Miao et al. "Self-organized multi-hop millimeter-wave backhaul network: Beam alignment and dynamic routing." Networks and Communications (EuCNC) 2015 European Conference on. IEEE 2015, 5 pages.
Vijayakumar et al. "Review on Routing Algorithms in Wireless Mesh Networks." International Journal of Computer Science and Telecommunications 3.5 (2012): 8792. http://www.ijcst.org/Volume3/Issue5/p15_3_5.pdf, 6 pages.
Bemmoussat et al."Efficient routing protocol to support qos in wireless mesh network." International Journal of Wireless & Mobile Networks 4.5 (2012): 89. http://search.proquest.com/openview/be6898c2de82656d6aa1ae75b947ede0/1 ?pqorigsite= Gscholar, 16 pages.
Draves et al. "Routing in multiradio multihop wireless mesh networks." Proceedings of the 10th annual international conference on Mobile computing and networking. ACM 2004. http://www.cs.jhu.edu/~cs647/classpapers/ Routing/p114draves. Pdf, 15
Wazwaz et al. "Medium Access and Routing in Multi Hop Wireless Infrastructures." Univ. of Twente Enschede the Netherlands (2005). https://www.utwente.nl/ewi/dacs/assignments/completed/master/reports/thesi s_aymanwazwaz.pdf, 91 pages.
Hong, et al. "Applications of selfinterference cancellation in 5G and beyond." IEEE Communications Magazine 52.2 (2014): 114121. http://stevenhong. com/pubs/CommMag145G. pdf, 8 pages.
Hossain. "5G wireless communication systems." American Journal of Engineering Research (AJER) e-ISSN (2013): 2320-0847. http://www.academia.edu/download/32242528/ZP210344353.pdf, 10 pages.
Osseiran, et al. "Scenarios for 5G mobile and wireless communications: the vision of the METIS project." IEEE Communications Magazine 52.5 (2014): 26-35. https://www.metis2020.com/wp-content/uploads/publications /IEEEComMag_Osseiran_et_al_METIS_overview_scenarios_201405.pdf, 20 pages.
Hu, et al. "An energy efficient and spectrum efficient wireless heterogeneous network framework for 5G systems." IEEE Communications Magazine 52.5 (2014): 94-101. http://www.academia.edu/download/34030549 /An_Energy_Efficient_and_Spectrum_Efficient_Wireless_Heterogeneous_Network_Framework_for, 8 pages.
Wu, et al. "Recent advances in energy-efficient networks and their application in 5G systems." IEEE Wireless Communications 22.2 (2015): 145-151. https://www.researchgate.net/profile/Gang_Wu15/publication /275673965_Recent_advances_in_energyefficient_networks_and_their_application_in_5G_systems/links/559f3d1508ae03c44a5ce9ac.pdf, 9 pages.
Nakamura, et al. "5G radio access: Requirements, concept and experimental trials." IEICE Transactions on Communications 98.8 (2015): 1397-1406. https://pdfs.semanticscholar.org/68fa/40d96cf347627d2a2875777de3de1fb43223.pdf,10 pages.
Kim, et al., "Interference Management via Sliding-Window Coded Modulation for 5G Cellular Networks." IEEE Communications Magazine, Nov. 2016, pp. 82-89, vol. 54, Issue 11, 8 pages.
International Search Report and Written Opinion for Application No. PCT/US2017/052582, dated Dec. 6, 2017, 16 pages.
Etri, "Potential CSI-RS and CSI feedback enhancements for EBF/FD-MIMO" 3GPP TSG RAN WG1 Meeting #19 San Francisco. USA, Nov. 11-21, 2014, 6 pages.
International Search Report and Written Opinion for Application No. PCT/US2017/052581 dated Nov. 24, 2017, 18 pages.
Nokia et al., "On System Design for Multiple Numerologies—Initial Access" 3GPP TSG-RAN WG1 #86, Gothenburg, Sweden, Aug. 22-26, 2016, 6 pages.
International Search Report and Written Opinion for Application No. PCT/US2017/052579, dated Jan. 2, 2018, 16 pages.
Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.
Catt: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.
Ntt Docomo et al., "Workplan for Study on NR Access Technology" 3GPP Draft; R1-167373 Work Plan for Nr, 3GPP TSG RAN WG1 Meeting #86, Göteborg, Sweden Aug. 22-26, 2016, 30 pages.
Huawei, HiSilicon, AT&T, Samsung, Qualcomm, Ericsson, ASTRI, [. . . ], "WF on Integrated Backhaul and Access", 3GPP Draft; R1-168429 3GPP TSG RAN WG1 Meeting #86 Gothenburg, Sweden, Aug. 22-26, 2016, 6 pages.
Invitation to Pay Additional Fees and, where Applicable, Protest Fee issued for Application No. PCT/US2017/052578 on Nov. 30, 2017, 18 pages.
Acampora et al., "Control and Quality-of-Service Provisioning in High-Speed Microcellular Networks" IEEE Personal Communications, Second Quarter 1994, pp. 34-43.
Graffi et al., "Monitoring and Management of Structured Peer-to-Peer Systems", IEEE P2P'09—Sep. 9-11, 2009, pp. 311-320.
Office Action for U.S. Appl. No. 15/376,137, dated Mar. 23, 2018, 38 pages.
International Search Report and Written Opinion for PCT Application No. PCT/US2017/052578 dated Jan. 22, 2018, 20 pages.
Office Action dated Apr. 5, 2018 for U.S. Appl. No. 15/376,377, 43 pages.
Non-Final Office Action received for U.S. Appl. No. 15/340,744 dated Apr. 26, 2018, 51 pages.
Non-Final Office Action received for U.S. Appl. No. 15/376,209 dated May 1, 2018, 68 pages.
Non-Final Office Action received for U.S. Appl. No. 15/445,760 dated Apr. 30, 2018, 47 pages.
Office Action dated Dec. 10, 2018 for U.S. Appl. No. 15/376,209, 37 pages.
Notice of Allowance received for U.S. Appl. No. 15/445,760 dated Sep. 24, 2018, 29 pages.
Final Office Action received for U.S. Appl. No. 15/340,744 dated Nov. 28, 2018, 38 pages.
Non-Final Office Action received for U.S. Appl. No. 15/376,209 dated May 2, 2019, 40 pages.

\* cited by examiner

| CQI INDEX | MODULATION | CODE RATE X1024 | EFFICIENCY |
|---|---|---|---|
| 0 | Out of range | Out of range | Out of range |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

FIG. 3

LINK ADAPTATION ON DOWNLINK CONTROL CHANNEL IN A WIRELESS COMMUNICATIONS SYSTEM

TECHNICAL FIELD

The subject disclosure relates generally to communications systems, and for example, to facilitating link adaptation on downlink control channels in a wireless communications system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 3 illustrates an example, non-limiting 4-bit channel quality index (CQI) table that can be employed in the two-stage downlink control channel in accordance with one or more embodiments described herein;

DETAILED DESCRIPTION

Figure 1:
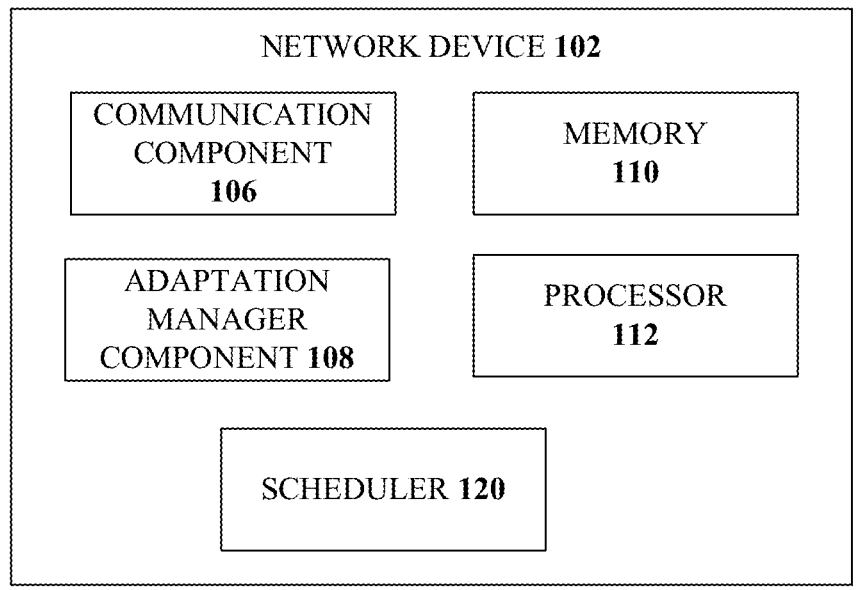
FIG. 1 illustrates an example, non-limiting communications system for providing link adaptation on a downlink control channel in a wireless communications system in accordance with one or more embodiments described herein.
Figure 1:
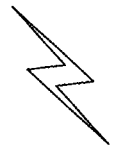
Figure 1:
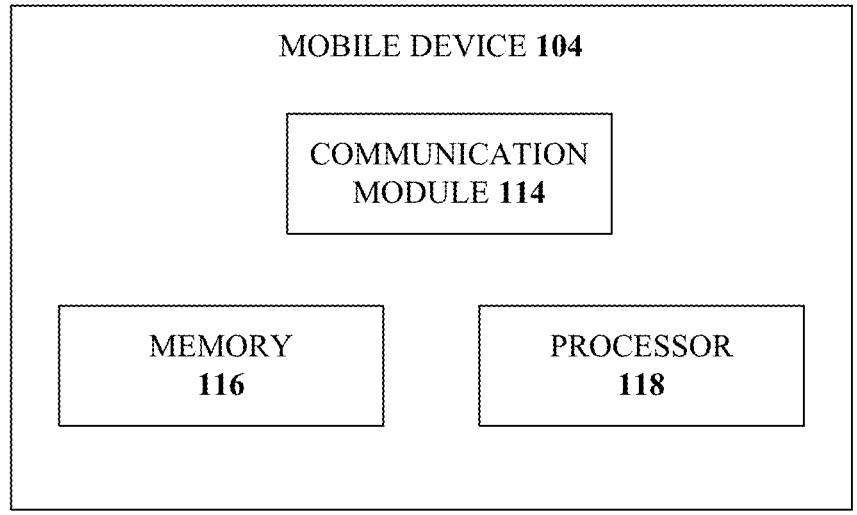

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that provide link adaptation gains to the downlink control channel such that the parameters related to the downlink control channel can be adapted according to the channel conditions, thereby efficiently using the transmission resources. Examples of the parameters can include, but are not limited to, reference signal (RS) density or the amount of reference symbols, modulation used for downlink control channel, code rate used for the downlink control channel, and/or frozen bit locations for a polar code. According to an implementation, a network node can indicate the parameters needed to decode control channel using higher layers (e.g., higher layer signaling). According to anther implementation, the network node can indicate, using a group common control channel, the parameters needed to decode the control channel In another implementation, the network node can adapt the transmission parameters based on feedback from the mobile device. In still another implementation, the network node can adapt the transmission parameters autonomously (e.g., without feedback from the mobile device).

The various aspects described herein relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

The communication link-system performance can be enhanced with the use of forward error correction codes. When forward error correction is applied to the information block the additional parity bits can be added to the information bits. These additional parity bits can protect the information bits when passed through the communication channel from effects of the channel (e.g., Additive White Gaussian Noise (AWGN), multipath fading and so on.). Currently, 3GPP is discussing forward error correction codes for data traffic channels and control channels, which have short block lengths for 5G systems. Examples of these include turbo convolution codes, low density parity check (LDPC) codes, and polar code.

For turbo convolution codes, two convolution codes can be concatenated in parallel and iterative decoding can be applied at the receiver. The convolution codes can perform close to Shannon limit in AWGN channels. The Shannon limit, or Shannon capacity, of a communications channel refers to a theoretical maximum information transfer rate of the channel for a particular noise level. Currently 3G and 4G systems are using these type of codes. LDPC codes, also referred to as Gallager codes, are a class of linear block codes where the parity check matrix is sparse (low density of 1s). When iterative decoding is applied at the receiver, these codes can perform close to Shannon capacity with less decoding complexity. Currently IEEE 802.11x, family uses LDPC codes as forward error correction code. Further, polar codes can achieve the symmetric capacity of arbitrary binary-input discrete memoryless channels under a low complexity successive cancellation decoding strategy. Based on performance in additive AWGN channels, LDPC code can be used for data traffic channels and polar codes can be used for control channels.

In one embodiment, described herein is a method that can comprise sending, by a network device of a wireless network and comprising a processor, first data indicating a first downlink control channel to a mobile device. The first data indicating the downlink control channel can comprise a first coreset indication that comprises a first parameter used to decode the first downlink control channel at the mobile device. The method can also include determining, by the network device, a second coreset indication for the mobile device. The second coreset indication can comprise a second parameter that can be adaptively determined based on a condition of an environment determined to be associated with the mobile device.

According to another embodiment, a system can comprise a processor and a memory that stores executable instructions that, when executed by the processor, facilitate performance of operations. The operations can comprise sending, to a mobile device, first data indicating a first downlink control channel that comprises a first indication of a first coreset. The first coreset can comprise a first parameter determined a priori and usable to decode the first downlink control channel at the mobile device. The operations can also include determining a second coreset for the mobile device.

The second coreset can comprise a second parameter that can be determined based on a condition of an environment of the mobile device. Further, the operations can include sending, to the mobile device, second data indicating a second downlink control channel that can comprise a second indication of the second coreset. The second coreset can comprise the second parameter usable to decode the second downlink control channel at the mobile device.

According to yet another embodiment, described herein is a machine-readable storage medium comprising executable instructions that, when executed by a processor, facilitate performance of operations. The operations can comprise sending first data indicating a first downlink control channel to a mobile device via a network device of network devices of a wireless network. The first downlink control channel can comprise a group common control channel. The first data indicating the first downlink control channel can comprise a first coreset indication that comprises a first parameter for decoding the first downlink control channel at the mobile device. The operations can also comprise determining a second coreset indication for the mobile device. The second coreset indication can comprise a second parameter that can be adaptively determined based on a condition of an environment determined to be associated with the mobile device. According to an implementation, the first coreset indication can be determined a priori by the network device irrespective of the condition of the environment determined to be associated with the mobile device. According to some implementations, the operations can further comprise determining the condition of the environment determined to be associated with the mobile device based on uplink channel information measured by the network device.

Referring initially to FIG. 1 illustrated is an example, non-limiting communications system 100 for providing link adaptation on downlink control channel in a wireless communications system in accordance with one or more embodiments described herein. The various aspects provided herein can provide link adaptation gains to the downlink control channel such that parameters related to the downlink control channel can be adapted according to the channel conditions. Examples of parameters related to downlink control comprise reference signal (RS) density, an amount, or quantity of reference symbols, modulation used for downlink control channel, code rate used for the downlink control channel, and/or frozen bit locations for the polar code. Adapting the parameters according to the channel condition can facilitate efficient use of transmission resources. For example, downlink control channel design can be efficient in terms of power and resources. The power and resources utilized for transmitting downlink control channel can be minimized Thus, with the disclosed aspects, efficient data transmission power and resources can improve the link and system throughput.

The non-limiting communications system 100 can comprise a network device 102 and a mobile device 104. The network device 102 can be included in a group of network devices of a wireless network. Although only a single mobile device and a single network device are illustrated, the non-limiting communications system 100 can comprise a multitude of mobile devices and/or a multitude of network devices.

The network device 102 can comprise a communication component 106 and an adaptation manager component 108. The communication component 106 can send first data indicating a first downlink control channel to the mobile device 104. The first data indicating the first downlink control channel can comprise a first coreset indication that comprises one or more parameters for decoding the first downlink control channel at the mobile device 104. Examples of the one or more parameters can comprise a defined reference signal density, an indication of a quantity of reference signals, or other parameters of a control resource that comprises downlink control information for decoding a downlink control channel at the mobile device 104.

The first coreset indication and the one or more parameters can be determined a priori by the network device irrespective of information associated with the mobile device 104. For example, the first downlink control channel can be a group common control channel, which is common to a multitude of mobile devices, including the mobile device 104. Accordingly, the multitude of mobile devices can receive the first coreset indication over the group common control channel.

The adaptation manager component 108 can modify the one or more parameters, which can be related to a second downlink control channel. The modification by the adaptation manager component 108 can be determined based on a condition of an environment as observed by the mobile device 104, or determined to be observed by the mobile device 104 (e.g., based on a determination by the network device 102 without input from the mobile device 104). The condition of the environment can be based on a channel quality index or other information provided by the mobile device 104. According to some implementations, the environment can be determined by a location of the mobile device 104 within the communications network (e.g., at a cell edge, at a center of the network, and so on).

For example, based on a condition of an environment of the mobile device, the adaptation manager component 108 can modify a second parameter of the control resource and the communication component 106 can send second data indicating the second downlink control channel to the mobile device 104. The second data indicating the second downlink control channel can comprise the adapted one or more parameters.

According to an implementation, the adaptation manager component 108 can indicate frozen bit locations, using higher layers (e.g., higher layer signaling), in order for the mobile device 104 to decode the control channel In another implementation, the adaptation manager component 108 can indicate the parameters needed by the mobile device 104 to decode the control channel with a group common control channel In a further implementation, the adaptation manager component 108 can adapt the parameters based on feedback received from the mobile device 104. In some implementations, the adaptation manager component 108 can adapt the parameters autonomously, without feedback from the mobile device 104.

The communication component 106 can be a transmitter/receiver configured to transmit to and/or receive data from the mobile device 104, other network devices, and/or other mobile devices. Through the communication component 106, the network device 102 can concurrently transmit and receive data, network device 102 can transmit and receive data at different times, or combinations thereof.

The network device 102 can also comprise a memory 110 operatively coupled to a processor 112. The memory 110 can store protocols associated with link adaptation as discussed herein. Further, the memory 110 can facilitate action to control communication between the mobile device 104 and the network device 102, such that the non-limiting communications system 100 can employ stored protocols and/or algorithms to achieve improved communications in a wireless network as described herein.

The mobile device 104 can also comprise a communication module 114. For example, the communication module 114 can be a transmitter/receiver configured to transmit to and/or receive data from the network device 102, other network devices, and/or other mobile devices. Through the communication module 114, the mobile device 104 can concurrently transmit and receive data, the mobile device 104 can transmit and receive data at different times, or combinations thereof.

Figure 2:
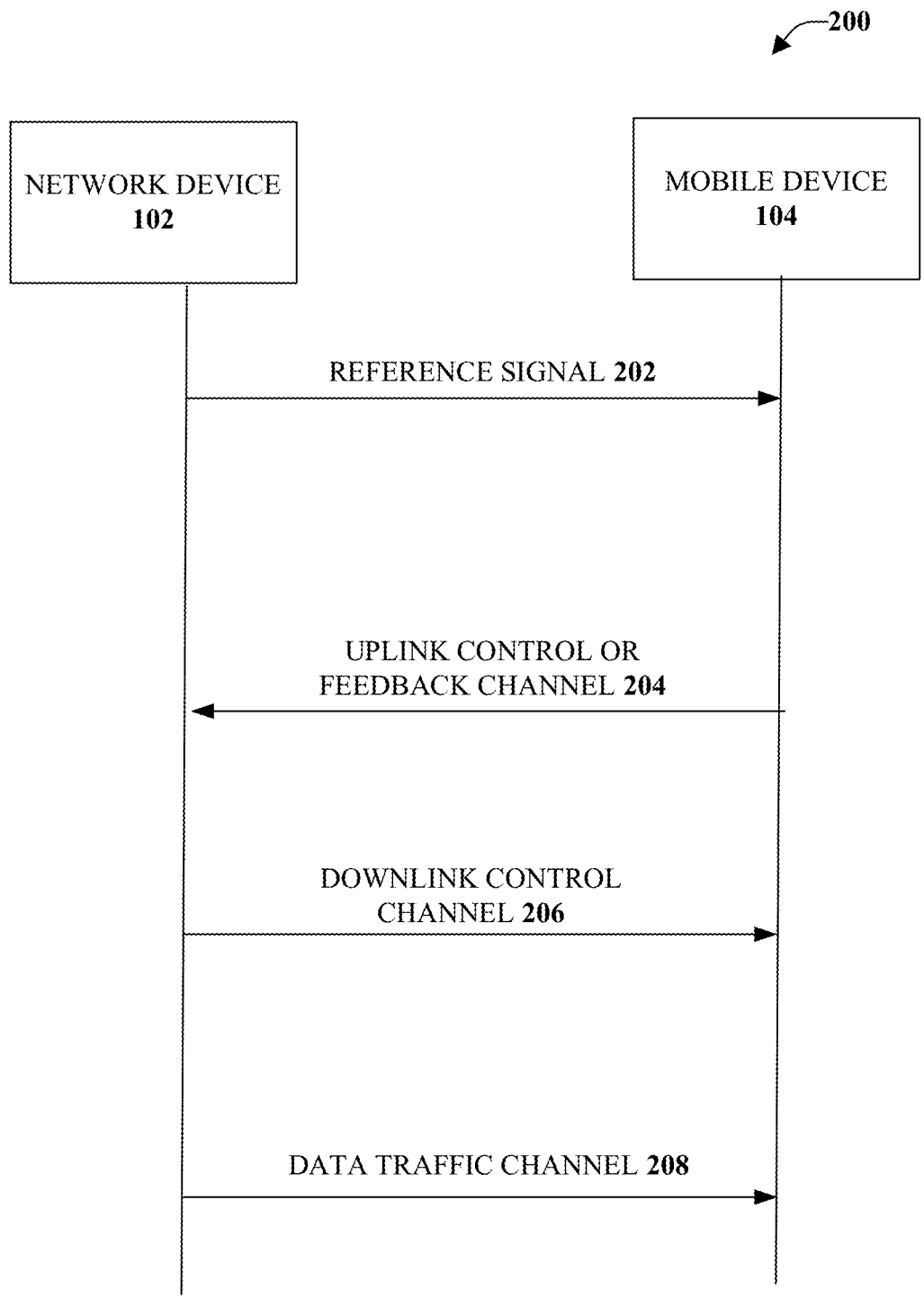
FIG. 2 illustrates an example, non-limiting message sequence flow chart that can facilitate downlink data transfer in accordance with one or more embodiments described herein.

Further, the mobile device 104 can comprise a memory 116 operatively coupled to a processor 118. The memory 116 can store protocols associated with link adaptation as discussed herein. Further, the memory 116 can facilitate action to control communication between the mobile device 104 and the network device 102, such that the non-limiting communications system 100 can employ stored protocols and/or algorithms to achieve improved communications in a wireless network as described herein To further explain the various aspects, FIG. 2 illustrates an example, non-limiting message sequence flow chart 200 that can facilitate downlink data transfer in accordance with one or more embodiments described herein. Repetitive description of like elements employed in other embodiments described herein is omitted for sake of brevity. The non-limiting message sequence flow chart 200 can be utilized for new radio, as discussed herein. As illustrated, the non-limiting message sequence flow chart 200 represents the message sequence between the network device 102 and the mobile device 104. As used herein, the term "network device 102" can be interchangeable with (or include) a network, a network controller or any number of other network components. One or more pilot signals and/or reference signals 202 can be transmitted from the network device 102 to the mobile device. The one or more pilot signals and/or reference signals 202 can be beamformed or non-beamformed. Based on the one or more pilot signals and/or reference signals 202, the mobile device 104 can compute the channel estimates and can determine the one or more parameters needed for channel state information (CSI) reporting. The CSI report can comprise, for example, channel quality indicator (CQI), preceding matrix index (PMI), rank information (RI), the best subband indices, best beam indices etc., or any number of other types of information.

The CSI report can be sent from the mobile device 104 to the network device 102 via a feedback channel (e.g., uplink control or feedback channel 204). The network device 102, which can comprise a scheduler 120, can use the CSI report for choosing the parameters for scheduling of the particular mobile device 104. The network device 102 can send the scheduling parameters to the mobile device 104 in a downlink control channel (e.g., downlink control channel 206). After the scheduling parameter information is transmitted, the actual data transfer can take place from the network device 102 to the mobile device 104 over the data traffic channel 208.

FIG. 3 illustrates an example, non-limiting 4-bit channel quality index (CQI) table that can be employed in a two-stage downlink control channel in accordance with one or more embodiments described herein. The network device 102 can configure a table such as the CQI table and the mobile device 104 can report a CQI index from the CQI table. This report from the mobile device 104 can be employed to report channel statistics information to the network device 102.

In one or more embodiments, the downlink control channel (e.g., the downlink control channel 206) can carry information about the scheduling grants providing transmission to and/or from the mobile device 104. This information can comprise a number of multiple input multiple output (MIMO) layers scheduled, transport block sizes, modulation for each codeword, parameters related to Hybrid Automatic Repeat Request (HARQ), sub band locations and also precoding matrix index corresponding to the sub bands. The information transmitted via downlink control information (DCI) format can include, but is not limited to, localized/distributed virtual resource block (VRB) assignment flag; resource block assignment; modulation and coding scheme; HARQ process number; new data indicator; redundancy version; transmission power control (TPC) command for uplink control channel; downlink assignment index; precoding matrix index; and/or number of layers.

As mentioned, 3GPP is looking towards extending the current 4G standards to 5G. However, there are numerous challenges and/or issues that are expected to arise. The communication between the transmitter (e.g., the network device 102) and the receiver (e.g., the mobile device 104) can be impacted by multipath fading. Link adaptation based on channel conditions can mitigate the impact of fading channels by transmitting robust modulation and/or code rate when the signal is experiencing poor channel conditions and transmitting higher modulation and/or code rate when the signal is experiencing good channel conditions. These approaches can be used in data traffic channels in limited scenarios (e.g., in the 3G and 4G systems), such as for data traffic channels.

Unfortunately, this approach cannot be employed for downlink control channels. This is because downlink control channels convey the information about the modulation and code rate for the data traffic channel. Further, the modulation format for the control channel is fixed to Quadrature Phase Shift Keying (QPSK). Accordingly, if link adaptation were to be employed, the mobile device would need to perform blind decoding of a control channel, which is very cumbersome as the mobile device would have to search all combinations of modulation formats and code rates. This extensive searching can drain the battery and resources of the mobile device and therefore is not viable with existing hardware. As a result, with the existing approaches the control channel cannot typically make use of approaches for link adaptation gains. The various aspects provided herein can apply the link adaptation for the control channel.

Figure 4:
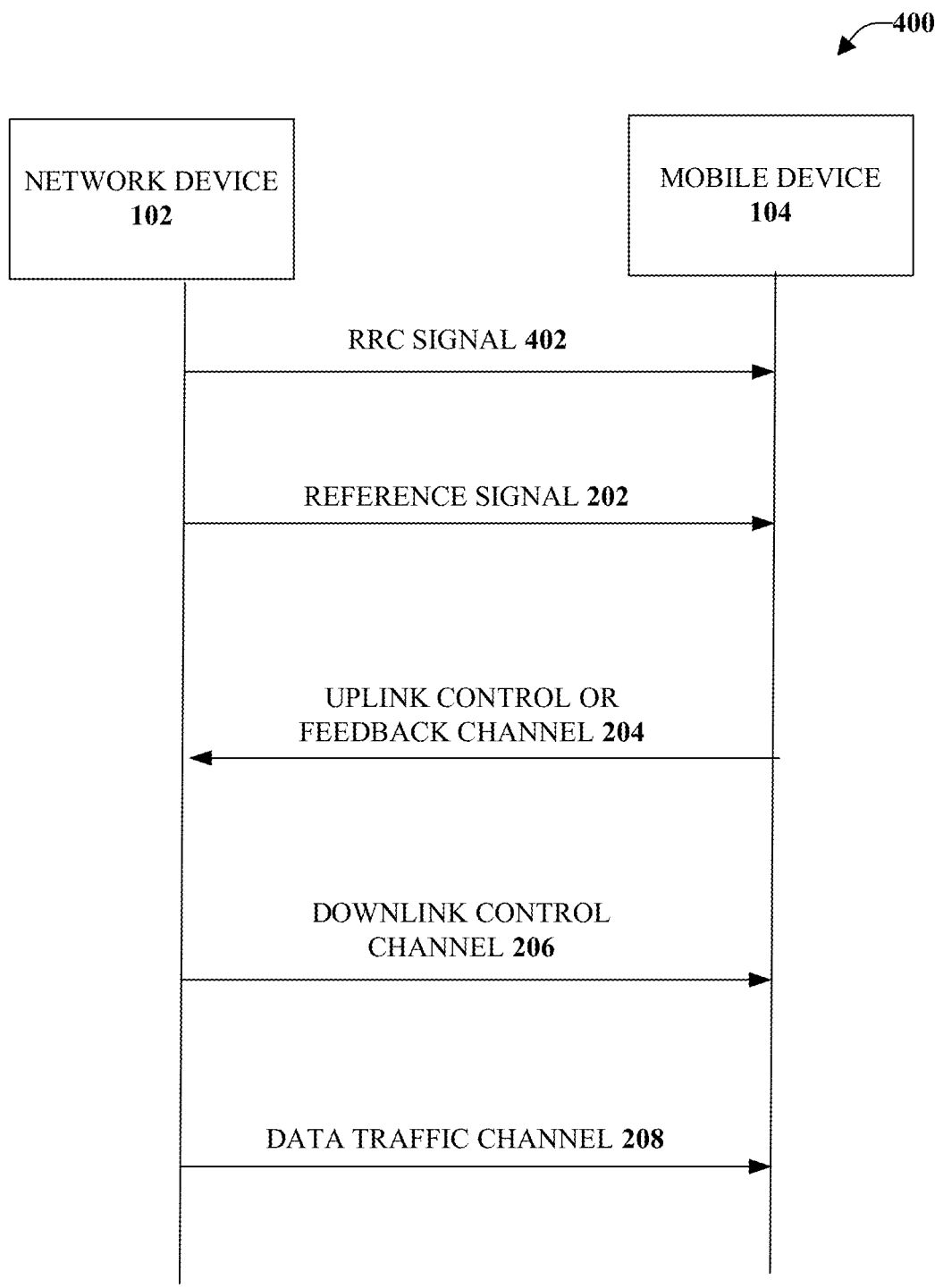
FIG. 4 illustrates an example, non-limiting message sequence flow chart that can facilitate configuring a mobile device using high layer signaling in accordance with one or more embodiments described herein.

FIG. 4 illustrates an example, non-limiting message sequence flow chart 400 that can facilitate configuring a mobile device using high layer signaling in accordance with one or more embodiments described herein. Repetitive description of like elements employed in other embodiments described herein is omitted for sake of brevity. The non-limiting message sequence flow chart 400 can be utilized for new radio, as discussed herein. As illustrated, the non-limiting message sequence flow chart 400 represents the message sequence between the network device 102 and the mobile device 104.

For decoding the downlink control channel, the mobile device 104 should know the reference signal locations, the slot structure where the mobile device 104 needs to search for the downlink control channel, the modulation format, the code rate, and the frozen bit locations for the polar code. In accordance with some implementations, some or all of these parameters can be sent from the network (e.g., the network device 102) in a downlink control channel. According to other implementations, some or all of these parameters can be determined by the mobile device 104, without network support.

As illustrated in FIG. 4 the network device 102 (e.g., a network node) can indicate the parameters that the mobile device 104 can use to decode the control channel using higher layers. As illustrated, a higher layer signal, such as a Radio Resource Control (RRC) signal (e.g., RRC signal 402) can be sent from the network device 102 to the mobile device 104. Thus, the mobile device 104 can be configured with a control resource set (e.g., a coreset). The control resource set can comprise a defined RS density, a fixed slot structure, a fixed modulation format, a fixed code rate, and fixed frozen bit locations (sequence). Upon or after the mobile device 104 receives the control resource set information, the mobile device 104 can use these parameters to decode DCI until the network (e.g., the network device 102) instructs the mobile device 104 to use another control resource set.

Figure 5:
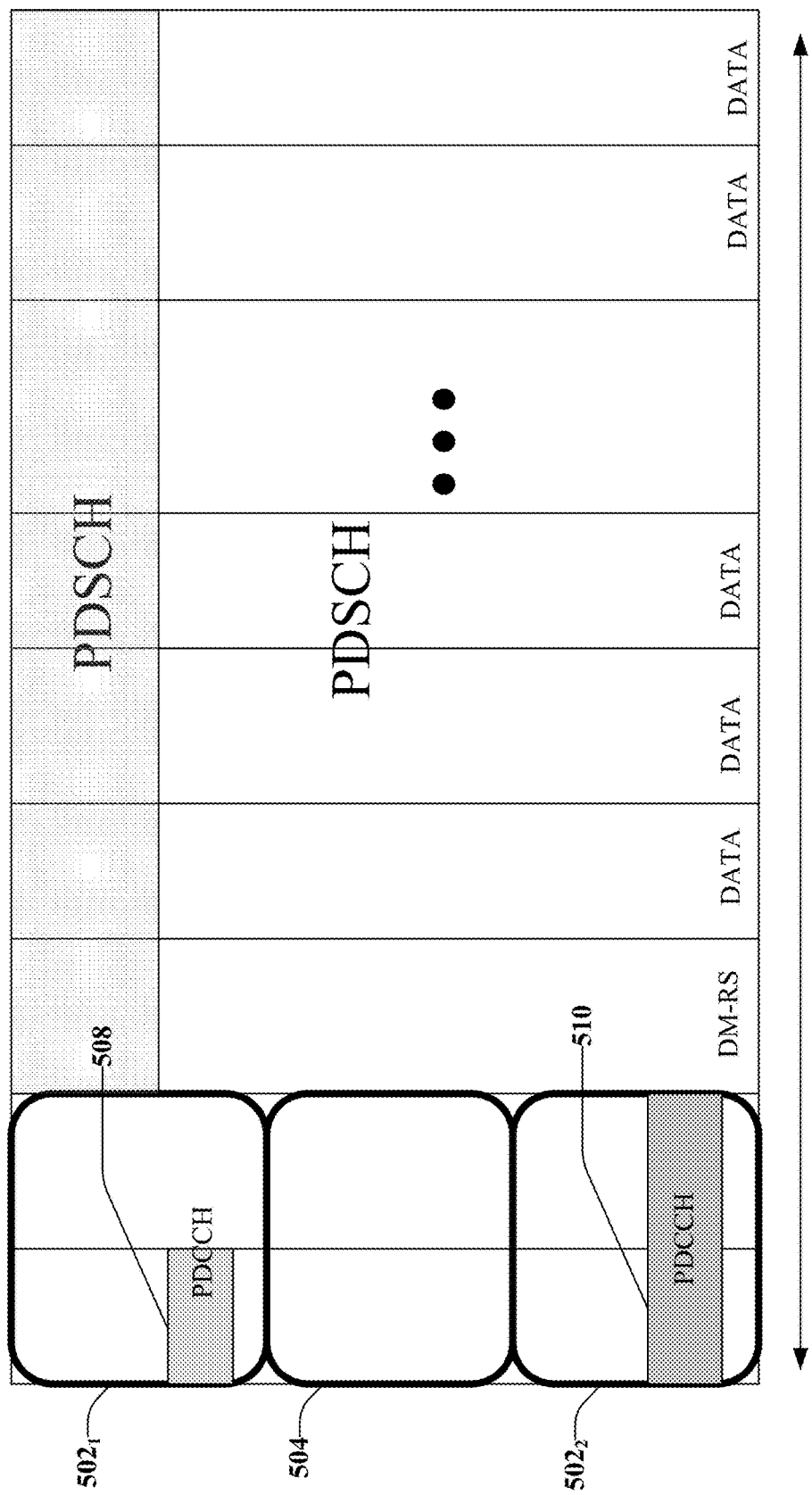
FIG. 5 illustrates an example, non-limiting representation of configuring the mobile device with a control resource set in accordance with one or more embodiments described herein.

FIG. 5 illustrates an example, non-limiting representation 500 of configuring the mobile device with a control resource set in accordance with one or more embodiments described herein. Repetitive description of like elements employed in other embodiments described herein is omitted for sake of brevity. The network can use two control resource sets, illustrated as a first control resource set 502 and a second control resource set 504. In this example, the two resource sets can be used for three mobile devices. Thus, the first resource set $502_1$ can be used for a first mobile device, the second control resource set 504 can be used for a second mobile device, and the first resources set $502_2$ can be used for a third mobile device in this example.

Figure 6:
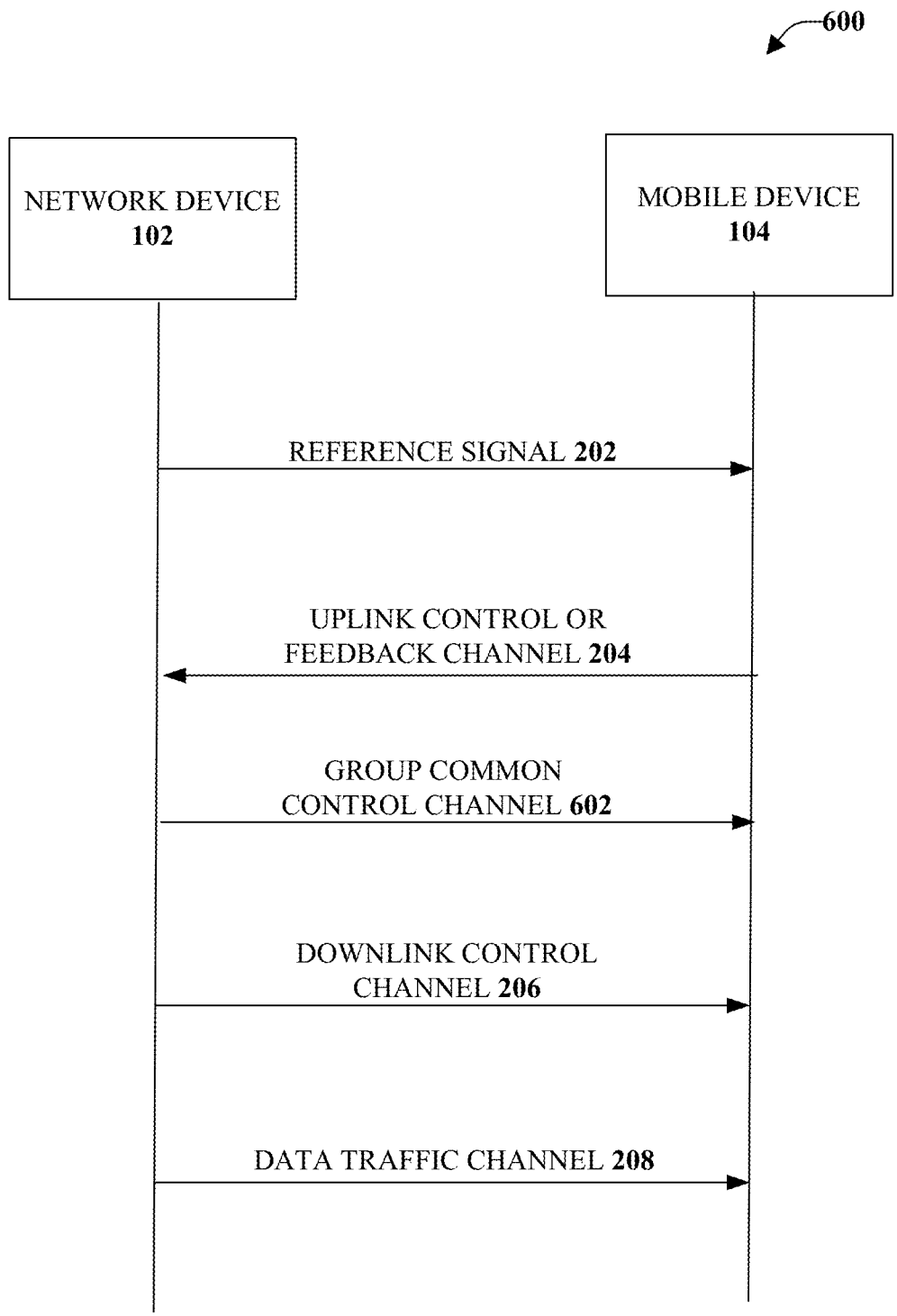
FIG. 6 illustrates an example, non-limiting message sequence flow chart that can facilitate configuring a mobile device with a group common control channel in accordance with one or more embodiments described herein.

Illustrated on the horizontal axis is a symbol period 506, which can be divided into time slots, which can have a predetermined duration. In an example, during the first time slot, the network device can transmit respective Physical Downlink Control Channels (PDCCHs) to the first mobile device (e.g., a first PDCCH 508) and the third mobile device (e.g., a second PDCCH 510). Further, the network device can send a demodulation reference signal (DM-RS) and respective Physical Downlink Shared Channels (PDSCHs) in the remaining time slots. The PDSCH can carry data for the mobile devices scheduled for data transmission on the downlink FIG. 6 illustrates an example, non-limiting message sequence flow chart 600 that can facilitate configuring a mobile device with a group common control channel in accordance with one or more embodiments described herein. Repetitive description of like elements employed in other embodiments described herein is omitted for sake of brevity. The non-limiting message sequence flow chart 600 can be utilized for new radio, as discussed herein. As illustrated, the non-limiting message sequence flow chart 600 represents the message sequence between the network device 102 and the mobile device 104.

According to the implementation of FIG. 6, the network node (e.g., the network device 102) can indicate, using group common control channel 602, the parameters to be used by the mobile device 104 to decode the control channel. The non-limiting message sequence flow chart 600 of FIG. 6 can be similar to the higher layer signaling, as discussed above. However, in this implementation, the parameters can be sent using a separate signaling (e.g., the group common control channel 602), which can be changed dynamically. Further, the other parameters can be sent explicitly (e.g., index of the coreset), thereby minimizing the overhead of the group common control channel. As an example, the group common control channel carries information of slot structure and index 1 of the coreset, which can be predefined. The network (e.g., the network device 102) can be provided the opportunity to change the coreset dynamically in the next instance as the group common control channel can be transmitted every time before the DCI is transmitted as illustrated in FIG. 6.

Figure 7:
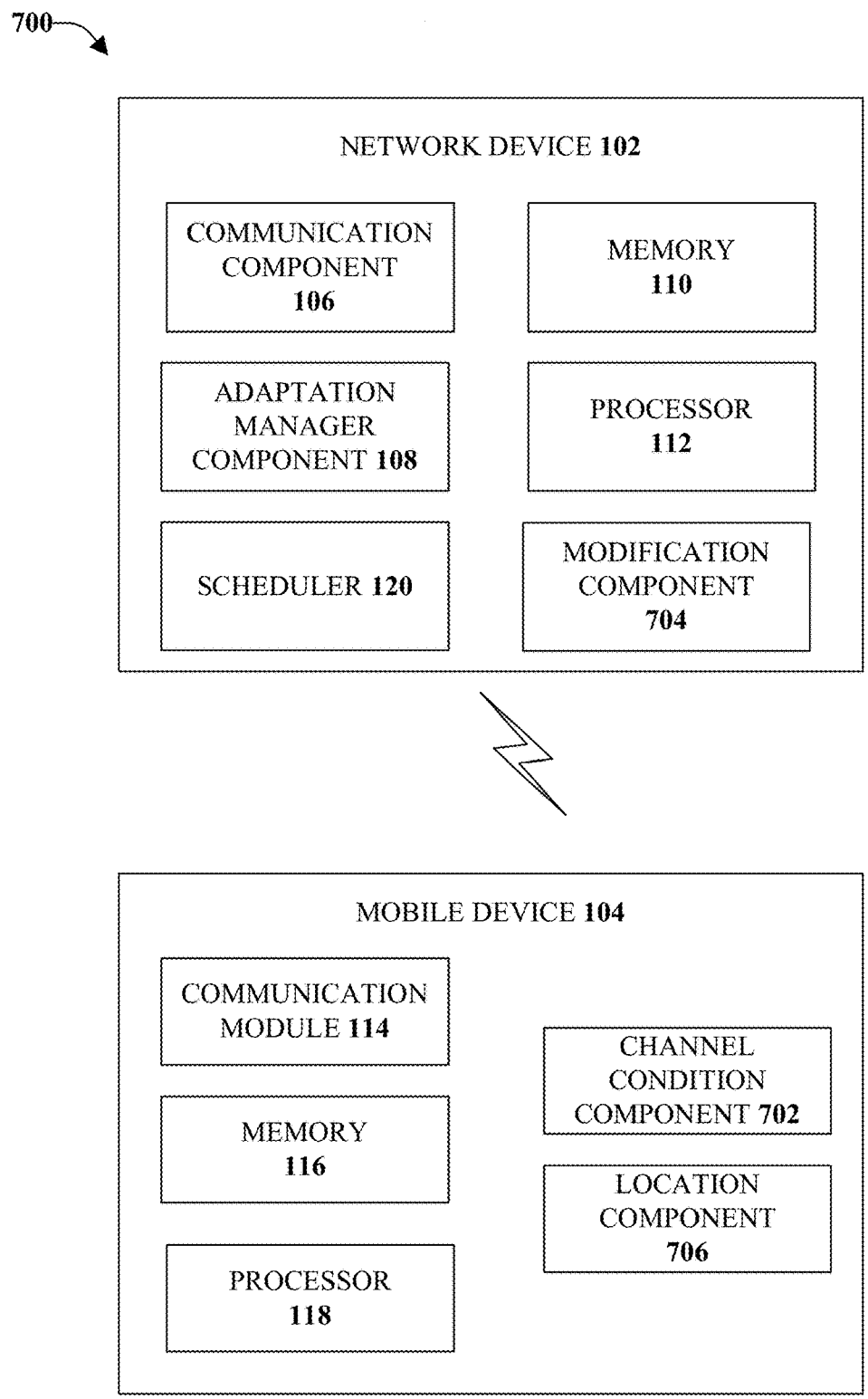
FIG. 7 illustrates an example, non-limiting communications system that provides link adaptation on a downlink control channel in accordance with one or more embodiments described herein.

FIG. 7 illustrates an example, non-limiting communications system 700 that provides link adaptation on downlink control channel in accordance with one or more embodiments described herein. Repetitive description of like elements employed in other embodiments described herein is omitted for sake of brevity. The non-limiting communications system 700 can comprise one or more of the components and/or functionality of non-limiting communications system 100 and vice versa.

As discussed with reference to FIGS. 1-6, the transmission parameters can be adapted based on a condition of an environment determined to be associated with the mobile device. The communication component 106 can facilitate sending first data indicating a first downlink control channel comprising a first parameter of a control resource to the mobile device 104. For example, the communication component 106 can send the first downlink control channel as a common group control channel According to some implementations, the communication component 106 can provide an instruction to another network device that the first downlink control channel should be sent to the mobile device 104.

The mobile device 104 can comprise a channel condition component 702 that can determine a condition of an environment in which the first downlink control channel was received. For example, the channel condition component 702 can evaluate an amount of noise on the transmission link or communication channel as experienced by the mobile device 104. In another example, the channel condition component 702 can evaluate the quality of the communication channel (e.g., wireless link) for other factors and can provide a channel quality indictor (CQI) to the network device 102 or another network device. Various manners of determining the condition of the environment by the mobile device 104 are known and can be utilized with the disclosed aspects and, therefore, will not be further discussed herein.

The communication component 106 can receive an indication from the mobile device 104 (e.g., from the communication module 114) related to condition of the environment of the mobile device. According to some implementations, the condition of the environment can be determined by the network device 102 based on uplink channel information measured by the network device 102.

Based on the condition of the environment determined to be associated with the mobile device, a modification component 704 can adaptively change one or more parameters (e.g., a second parameter, a subsequent parameter) of a control resource. Sending second data indicating the second downlink control channel with the second parameter to the mobile device 104 can be facilitated by the communication component 106.

In an implementation, the first parameter can comprise a first modulation format of the first downlink control channel, and the second parameter can comprise a second modulation format for the second downlink control channel. In another implementation, the first parameter can comprise a first code rate for the first downlink control channel, and the second parameter can comprise a second code rate for the second downlink control channel. In yet another implementation, the first parameter can comprise a first frozen bit location for a first polar code of the first downlink control channel, and the second parameter can comprise a second frozen bit location for a second polar code of the second downlink control channel In another implementation, the first parameter can comprise a first reference signal density, and the second parameter can comprise a second reference signal density.

In an alternative or additional implementation, the mobile device 104 can comprise a location component 706 that can determine and provide to the network device 102 a location of the mobile device 104. Based on the location of the mobile device 104, the second (or subsequent) parameters can be adaptively modified.

For example, based on feedback from the mobile device (e.g., condition of the environment, location, and so on), the modification component 704 can determine which coresets to choose. The mobile device can send channel state information periodically or on demand. These parameters can be used for link adaptation on data channel. The scheduler 120 can choose these parameters to determine the coreset. For example if the network (e.g., the network device 102) observes the CQIs received from the mobile device 104 over a period of time, the modulation, code rate and frozen bit locations can be chosen for that particular mobile device 104.

According to some implementations, the network device 102 can adapt the transmission parameters autonomously. Thus, the network device 102 can choose the coreset with feedback from the mobile device 104. For example, if the mobile device 104 is located at a cell edge (e.g., is a cell edge device, is proximate to a cell edge of the wireless network) a first coreset can be chosen. However, if the mobile device 104 is located in the cell center, a second coreset can be chosen.

Thus, the encoding and modulation of the second portion can be dynamically changed from time to time based on various different information including, but not limited to, channel conditions (as detected by the mobile device 104 via the downlink, as detected on the uplink by the network device 102) or based on an amount of resources for the control channel. In some embodiments, decisions regarding the parameter can be made in any number of ways: (1) since link adaptation is from the mobile device 104, based on the mobile device 104 sending channel information (and the network device 102 can infer the type of channel the mobile device is in with regard to the signal to noise ratio (SNR) and state of the channel (this can be a feedback approach); (2) based on the load in which if there is a need for more resources because there is a higher bit rate of data in the load, the network device 102 can select parameters using a higher modulation rate to free up data; and/or (3) the network device 102 can determine the SNR or the channel state based on channel uplink measurements.

In one embodiment, the network device 102 can choose these parameters based on channel state information received from the mobile device 104. In another embodiment, the network device 102 can choose these parameters based on load. For example, if the network device 102 has few resources for control channel, then the network device 102 can use higher modulation to free up the resources as higher modulations can be more bandwidth efficient. In another embodiment, the network device 102 can choose these parameters based on channel measurements in the downlink or uplink for example in a time division duplex (TDD) system the network device 102 can use reciprocity to decide about these parameters.

In some embodiments, if there are no resources for the control channel (or resources less than a defined amount or type) and the mobile device 104 is experiencing satisfactory channel conditions (e.g., channel conditions having a signal-to-noise ratio greater than or equal to a defined value) then the network device 102 can employ QPSK. If the mobile device 104 is in an environment having a channel that is not satisfactory (e.g., channel conditions having a signal-to-noise ratio less than a defined value) then the network device 102 can employ QAM, for example.

Figure 8:
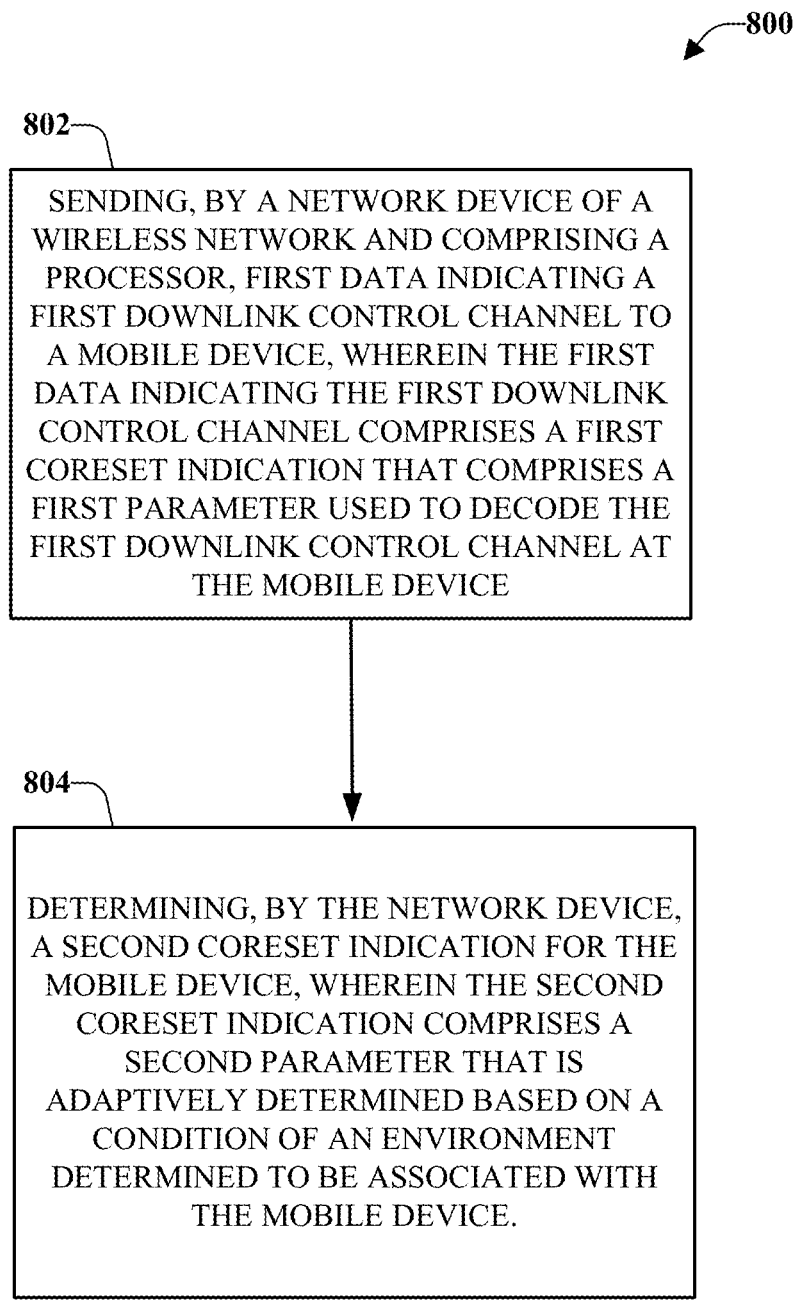
FIG. 8 illustrates an example, non-limiting method for link adaptation on a downlink control channel in accordance with one or more embodiments described herein.

In some embodiments, the parameters in the first coreset are determined a priori by the network device, wherein the first parameter can be associated with a first type of modulation scheme and a first code rate and wherein the second parameter can be associated with a second type of modulation scheme and a second code rate. In some embodiments, the first parameter comprises a first modulation type based on a determination that a signal-to-noise ratio of the channel satisfies a defined condition and wherein the second parameter comprises a second modulation type based on a determination that the signal-to-noise ratio of the channel fails to satisfy the defined condition FIG. 8 illustrates an example, non-limiting method 800 for link adaptation on downlink control channel in accordance with one or more embodiments described herein. The non-limiting method 800 starts at 802 with sending, by a network device of a wireless network and comprising a processor first data indicating a first downlink control channel to a mobile device. The first data indicating the first downlink control channel can comprise a first coreset indication that comprises a first parameter used to decode the first downlink control channel at the mobile device. The first downlink control channel can be a group common control channel. Further, the first coreset indication can be determined a priori by the network device. According to an implementation, the first downlink control channel can comprise a downlink control channel configured to operate according to a fifth generation wireless communication network protocol.

At 804, the network device can determine a second coreset indication for the mobile device. The second coreset indication can comprise a second parameter that can be adaptively determined based on a condition of an environment determined to be associated with the mobile device. According to an implementation, the method can include determining, by the network device, the condition of the environment based on a determined location of the mobile device within the wireless network. Further to this implementation, the method can include determining, by the network device, the second parameter based on the determined location of the mobile device being proximate to a cell edge of the wireless network. Alternatively, the method can include determining, by the network device, the second parameter based on the determined location of the mobile device being within a defined area of the wireless network.

In accordance with some implementations, the method can include determining, by the network device, the condition of the environment based on an indication, received from the mobile device, of a quality of a communication channel used for the first downlink control channel According to other implementations, the method can include determining, by the network device, the condition of the environment based on uplink channel information measured by the network device during a receipt of the first downlink control channel at the mobile device.

Figure 9:
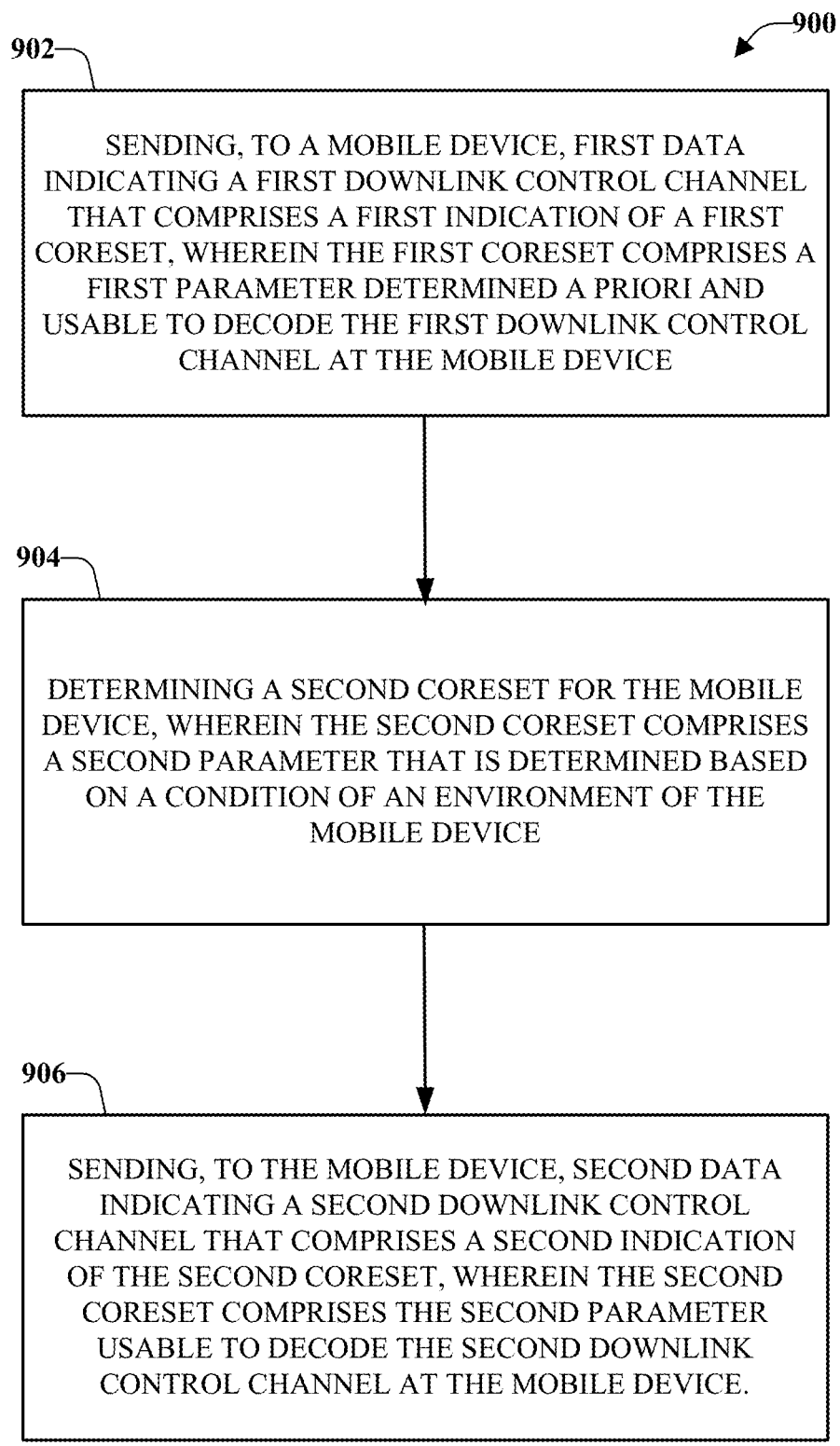
FIG. 9 illustrates an example, non-limiting method for link adaptation on a downlink control channel using polar codes in a wireless communications network in accordance with one or more embodiments described herein.

FIG. 9 illustrates an example, non-limiting method 900 for link adaptation on downlink control channel using polar codes in a wireless communications network in accordance with one or more embodiments described herein. The method can be implemented by a system comprising a processor and a memory. The memory can store executable instructions that, when executed by the processor, facilitate performance of operations and/or performance of the method.

At 902, the non-limiting method 900 comprises sending, to a mobile device, first data indicating a first downlink control channel that comprises a first indication of a first coreset. The first coreset can comprise a first parameter determined a priori and usable to decode the first downlink control channel at the mobile device. Sending the first downlink control channel can comprise sending a group common control channel that comprises the first indication of the first coreset.

A second coreset for the mobile device can be determined, at 904. The second coreset can comprise a second parameter that can be determined based on a condition of an environment of the mobile device. According to an implementation, the condition of the environment can be determined based on a location of the mobile device within a wireless network during a receipt of the first downlink control channel In an additional or alternative implementation, the condition of the environment can be determined based on an indication, received from the mobile device, of a quality of a communication channel during a receipt of the first downlink control channel At 906, second data indicating a second downlink control channel that comprises a second indication of the second coreset can be sent to the mobile device. The second coreset can comprise the second parameter usable to decode the second downlink control channel at the mobile device. According to an implementation, the first parameter can comprise a first modulation format of the first downlink control channel, and the second parameter can comprise a second modulation format for the second downlink control channel. According to another implementation, the first parameter can comprise a first code rate for the first downlink control channel, and the second parameter can comprise a second code rate for the second downlink control channel In accordance with another implementation, the first parameter can comprise a first frozen bit location for a first polar code of the first downlink control channel, and the second parameter can comprise a second frozen bit location for a second polar code of the second downlink control channel. According to yet another implementation, the first parameter can comprise a first reference signal density, and the second parameter can comprise a second reference signal density.

Described herein are systems, methods, articles of manufacture, and other embodiments or implementations that can facilitate link adaptation on downlink control channels using polar codes in a 5G network. Facilitating link adaptation on downlink control channels for a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 10:
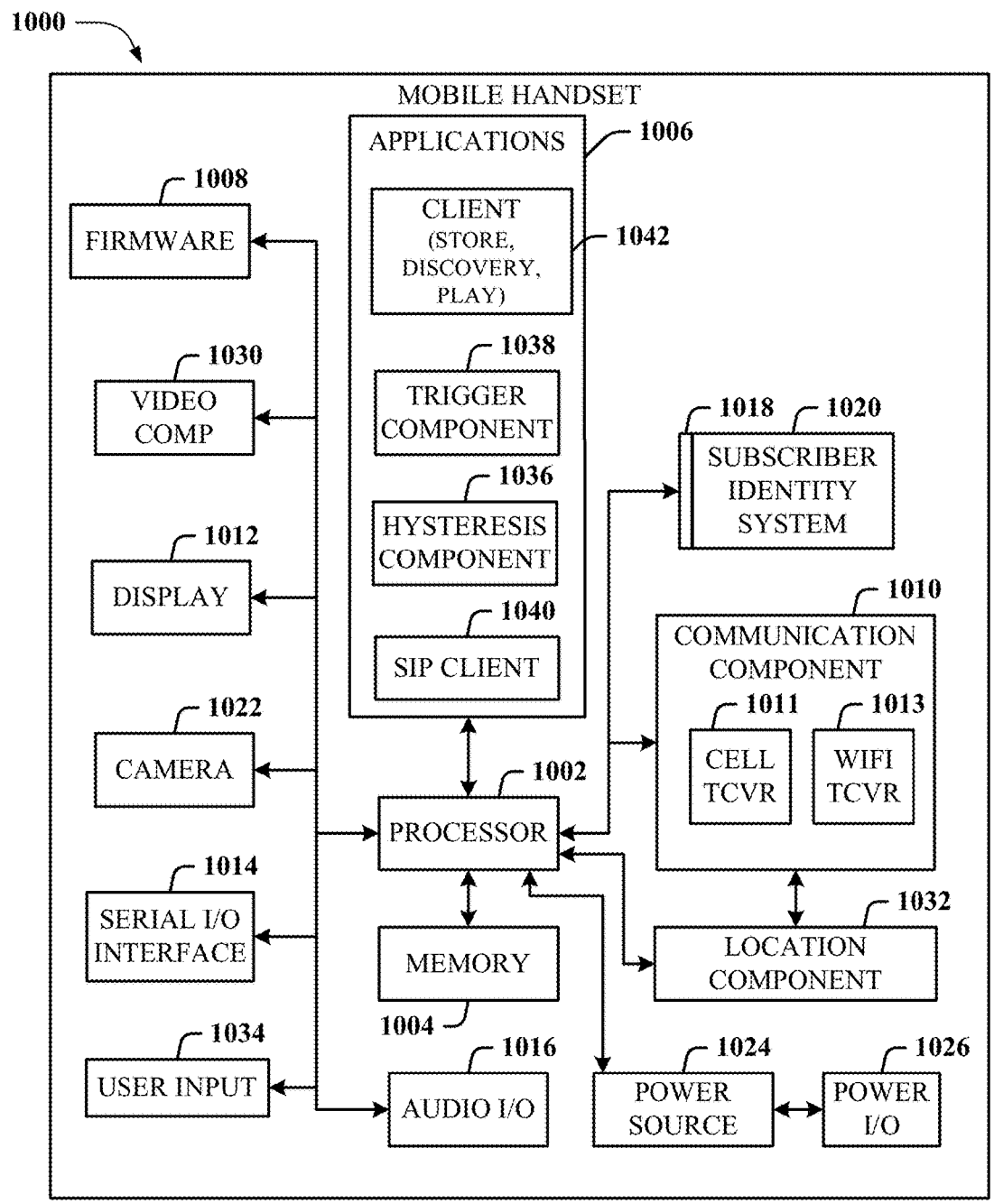
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
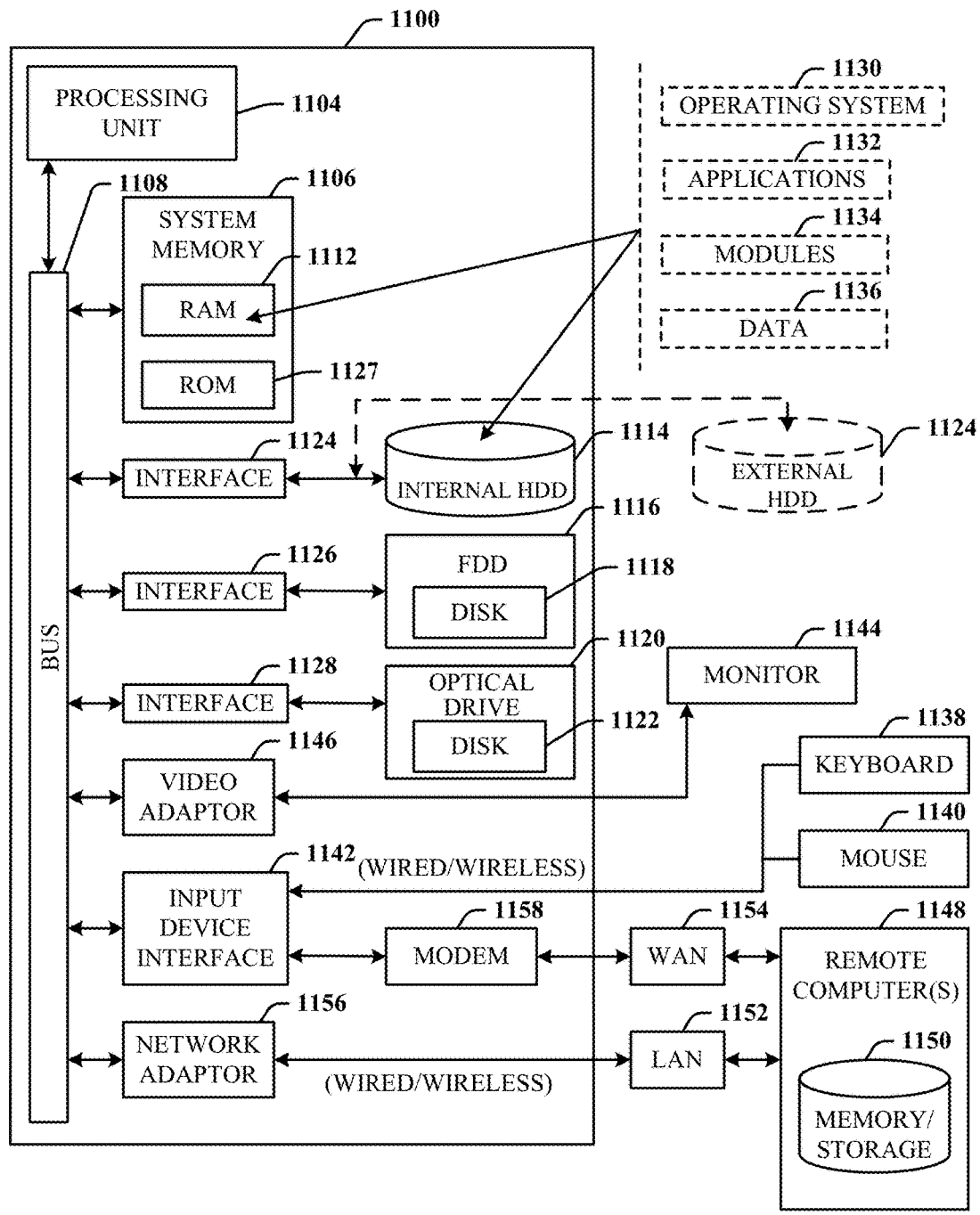
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component may be, but is not limited to being, a process running on a processor, a processor, an object, an executable, a thread of execution, computer-executable instructions, a program, and/or a computer. By way of illustration and not limitation, both an application running on a server and the server can be a component One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows. Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet. Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   sending, by a network device of a wireless network and comprising a processor, first data indicating a first downlink control channel to a mobile device, wherein the first data indicating the first downlink control channel comprises a first control resource set indication that comprises a first parameter comprising a first modulation format to be used by the mobile device to decode the first downlink control channel at the mobile device and comprising a first frozen bit location for a first polar code of the first downlink control channel; and
   determining, by the network device, a second control resource set indication for the mobile device, wherein the second control resource set indication comprises a second parameter comprising a second modulation format that is adaptively determined, by the network device, based on a condition of an environment determined to be associated with the mobile device and comprising a second frozen bit location for a second polar code of the second downlink control channel.

2. The method of claim 1, wherein the first downlink control channel is a group common control channel.

3. The method of claim 2, wherein the first control resource set indication is determined a priori by the network device.

4. The method of claim 1, further comprising determining, by the network device, the condition of the environment based on a determined location of the mobile device within the wireless network.

5. The method of claim 4, further comprising, determining, by the network device, the second parameter based on the determined location of the mobile device being proximate to a cell edge of the wireless network.

6. The method of claim 4, further comprising, determining, by the network device, the second parameter based on the determined location of the mobile device being within a defined area of the wireless network.

7. The method of claim 1, further comprising, determining, by the network device, the condition of the environment based on an indication, received from the mobile device, of a quality of a communication channel used for the first downlink control channel.

8. The method of claim 1, further comprising, determining, by the network device, the condition of the environment based on uplink channel information measured by the network device during a receipt of the first downlink control channel at the mobile device.

9. The method of claim 1, wherein the first downlink control channel comprises a downlink control channel configured to operate according to a fifth generation wireless communication network protocol.

10. A system, comprising:
a processor; and
a memory that stores executable instructions that, when executed by the processor, facilitate performance of operations, comprising:
sending, to a mobile device, first data indicating a first downlink control channel that comprises a first indication of a first control resource set, wherein the first control resource set comprises a first parameter comprising a first modulation format that is determined a priori and usable to decode the first downlink control channel at the mobile device;
determining a second control resource set for the mobile device, wherein the second control resource set comprises a second parameter comprising a second modulation format that is determined based on a condition of an environment of the mobile device; and
sending, to the mobile device, second data indicating a second downlink control channel that comprises a second indication of the second control resource set, wherein the second control resource set comprises the second parameter usable to decode the second downlink control channel at the mobile device,
wherein the first parameter comprises a first frozen bit location for a first polar code of the first downlink control channel, and wherein the second parameter comprises a second frozen bit location for a second polar code of the second downlink control channel.

11. The system of claim 10, wherein the sending the first data indicating the first downlink control channel comprises sending a group common control channel that comprises the first indication of the first control resource set.

12. The system of claim 10, wherein the first parameter comprises a first modulation format of the first downlink control channel, and wherein the second parameter comprises a second modulation format for the second downlink control channel.

13. The system of claim 10, wherein the first parameter comprises a first code rate for the first downlink control channel, and wherein the second parameter comprises a second code rate for the second downlink control channel.

14. The system of claim 10, wherein the first parameter comprises a first reference signal density, and wherein the second parameter comprises a second reference signal density.

15. The system of claim 10, wherein the operations further comprise:
determining the condition of the environment based on a location of the mobile device within a wireless network during a receipt of the first downlink control channel.

16. The system of claim 10, wherein the operations further comprise:
determining the condition of the environment based on an indication, received from the mobile device, of a quality of a communication channel during a receipt of the first downlink control channel.

17. A machine-readable storage medium, comprising executable instructions that, when executed by a processor, facilitate performance of operations, comprising:
sending first data indicating a first downlink control channel to a mobile device via a network device of network devices of a wireless network, wherein the first downlink control channel comprises a group common control channel, and wherein the first data indicating the first downlink control channel comprises a first control resource set indication that comprises a first parameter comprising a first modulation format for a decoding of the first downlink control channel at the mobile device; and
determining a second control resource set indication for the mobile device, wherein the second control resource set indication comprises a second parameter comprising a second modulation format that is adaptively determined based on a condition of an environment determined to be associated with the mobile device, wherein the first parameter comprises a first frozen bit location for a first polar code of the first downlink control channel, and wherein the second parameter comprises a second frozen bit location for a second polar code of the second downlink control channel.

18. The machine-readable storage medium of claim 17, wherein the first control resource set indication is determined a priori by the network device irrespective of the condition of the environment determined to be associated with the mobile device.

19. The machine-readable storage medium of claim 17, wherein the operations further comprise determining the condition of the environment determined to be associated with the mobile device based on uplink channel information measured by the network device.

* * * * *